United States Patent Office 3,544,424
Patented Dec. 1, 1970

3,544,424
NUCLEAR POWER PLANT WITH WET-STEAM GENERATOR AND STEAM DRYING SYSTEM
Hans Mayer and Werner Bohmann, Erlangen, Germany, assignors to Siemens Aktiengesellschaft, a corporation of Germany
Filed Dec. 5, 1967, Ser. No. 688,049
Claims priority, application Germany, Dec. 28, 1966, S 107,637
Int. Cl. G21c 15/16
U.S. Cl. 176—55
5 Claims

ABSTRACT OF THE DISCLOSURE

A nuclear power plant with a pressurized-water reactor or boiling-water reactor for producing steam for a turbine is provided with a system which dries the generated wet steam by means of two mutually spaced separators. One of them is a pre-separator, such as a baffle structure, and is mounted in the steam plenum chamber of the wet-steam generating boiler or tank of the reactor. The other, main separator is located in the steam line just ahead of the turbine and consists of a centrifugal water-from-steam separator such as a cyclone.

---

Figures 1, 2:
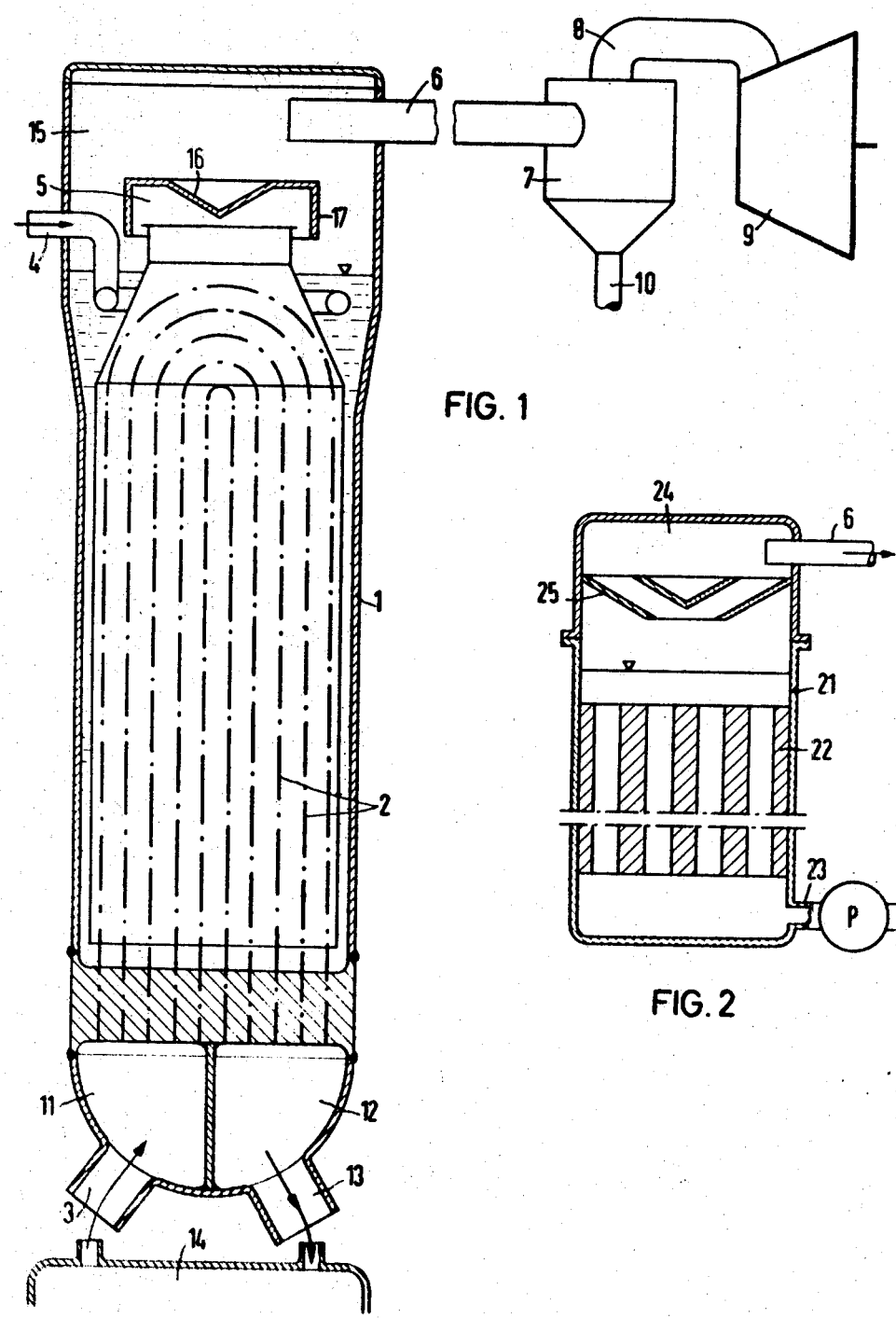

Our invention relates to nuclear power plants in which wet steam is generated by the heat of the nuclear reaction and supplied through a steam line to a turbine for producing electrical energy. More specifically the invention concerns a system of drying the wet steam generated in the boiler of a pressurized-water reactor or in the tank of a boiling-water reactor that forms part of such a power plant.

Drying the wet steam in such nuclear-energy plants within the steam generator proper or within the reactor pressure tank operating as a steam generator, involves the danger that, due to the great length of the steam line usually required between steam generator and turbine and also due to the inevitable pressure drop in this line, some of the steam will recondense so that the turbine receives steam of relatively large moisture content. Furthermore, the accommodation of the steam drying devices within the steam generator proper, such as in the boiler of a pressurized-water reactor or in the tank of a boiling-water reactor, requires a greatly increased overall hight of the nuclear power equipment.

In contrast thereto it is an object of our invention to provide the turbine in such nuclear power plants with steam of a higher and more reliable degree of dryness in order to afford a better utilization of the steam generated, as well as a larger working range of the steam within the turbine equipment.

To this end, and in accordance with out invention, we subdivide the drying system of the power plant into two spacially separated portions. Within the steam generator or reactor proper, we provide only for pre-drying of the steam down to a residual moisture content of approximately 3%. Due to the inevitable pressure drop in the steam line leading to the turbine, the water content will slightly increase before the steam reaches the turbine end of the line. However, according to the invention we locate the main drying equipment in the steam line between the steam generator and the turbine, shortly ahead of the turbine inlet, and we employ for this purpose a water-from-steam separator such as a cyclone or other centrifugal separator system. As a result the turbine receives the virtually fully dried and saturated steam issuing from the dry-steam outlet of the main separator vessel.

Aside from thus providing the turbine with reliably dry steam, the division of the drying system into the above-mentioned two portions permits reducing the overall height of the reactor equipment proper. The particularly applies to the building which can be reduced by the height of the water separators heretofore accomodated above the reactors proper. In consequence, the building costs are also reduced considerably, and this leads to lower total cost of the plant as the space needed for the addition or accommodation of the main separator is more conveniently available at a locality spaced from the reactor building.

The invention will be further described with reference to embodiments illustrated by way of example on the accompanying drawing in which:

FIG. 1 shows schematically a power plant comprising a pressurized-water reactor, the boiler portion of the reactor equipment being shown schematically in axial section; and FIG. 2 shows schematically and in section the reactor tank of a boiling-water reactor equipped with a pre-separator, the non-illustrated portions of the system being as shown in FIG. 1.

According to FIG. 1 the steam generator 1 comprises essentially a number of pressurized-water tubes 2 which form U-shaped loops and communicate with two plenum chambers 11 and 12 which receive hot water under pressure through an inlet 3 and an outlet 13 and are connected into the circulatory system of a pressurized-water reactor schematically shown at 14. Feedwater is supplied through an inlet pipe 4 and is evaporated at the bunches of U-shaped pressure tubes 2. The ascending wet steam is pre-dried by a baffle-type separator 5 and collects in an upper plenum chamber 15 from which it enters into the steam line 6. A main dryer, 7 constituted by a centrifugal separator such as a cyclone or any other conventional water-from-steam separator suitable for such purposes is connected to the turbine end of the steam line. The resultant dry and saturated steam leaves the top outlet 8 of the separator to pass through a short duct directly into the turbine 9. The separated water drains through a pipe 10 from the bottom of the main separator and may be recirculated back into the feed-water circulation system of the plant.

The pre-separator 5 is constituted by one or several baffle structures 16 and may have a peripheral wall structure provided with slots such as the one shown 17. Pre-separators of other types that can be accommodated in a similarly small space are likewise applicable since only a partial drying, such as down to 3% or generally a few percent moisture content, is sufficient at this locality.

FIG. 2 shows at 21 the tank of a boiling-water reactor which contains the reactor core 22. Feedwater is supplied from below through an inlet 23 and passes through the channels of the core 22. The steam generated in the tank collects in a plenum chamber 24 after passing through a pre-separator 25 composed of several baffle structures. The water separated by the baffle structure 25 drains back into the water content of the tank 21. The pre-dried steam passes through the steam line 6 to the main separators 7 and thence to the turbine 9 as explained with reference to FIG. 1.

To those skilled in the art it will be obvious upon a study of this disclosure that our invention permits of various modifications and may be given embodiments other than particularly illustrated and described herein, without departing from the essential features of the invention and within the scope of the claims annexed hereto.

We claim:

1. With a nuclear power plant comprising a wet-steam generator operated by heat of nuclear reaction, a steam turbine and a steam line connecting said turbine to said generator, in combination a steam drying system having a single pre-separator mounted in a steam plenum chamber of said wet-steam generator for reducing the moisture content of the steam entering said line, said steam plenum chamber constituting a minor fraction of the volume of said generator, and a main separator constituted by a water-from-steam separator and disposed in said steam line at a locality directly ahead of said turbine for supplying dry steam to said turbine.

2. In a power plant according to claim 1, said wet-steam generator being the boiler of a pressurized water reactor, said steam plenum chamber having an outlet through said steam line, and said pre-separator being mounted in said plenum chamber ahead of said outlet.

3. In a power plant according to claim 1, said wet-steam generator being the tank of a pressurized water reactor, said steam plenum chamber having an outlet through said steam line, and said pre-separator being mounted in said plenum chamber ahead of said outlet.

4. In a power plant according to claim 1, said wet-steam generator comprising a vessel having in its top portion said steam plenum chamber with an outlet through said steam line, and said pre-separator comprising baffle structures mounted in and across said plenum chamber at a locality ahead of said outlet.

5. In a power plant according to claim 4, said main separator being of the centrifugal type and having a dry-steam outlet joined with said turbine.

References Cited

UNITED STATES PATENTS

| | | | |
|---|---|---|---|
| 2,998,363 | 8/1961 | Blaser | 176—56 |
| 3,036,965 | 5/1962 | Braun | 176—56 |
| 3,041,264 | 6/1962 | Ricard | 176—54 |
| 3,213,833 | 10/1965 | Cunningham et al. | 122—34 |
| 3,247,650 | 4/1966 | Kornbichler | 176—54 |
| 3,296,779 | 1/1967 | Daman et al. | 122—34 |
| 3,325,374 | 6/1967 | Margen | 122—34 |

OTHER REFERENCES

International Conf. on the Peaceful Uses of Atomic Energy, 1955, vol. 3, pp. 56, 58–62, 67, 68.

BENJAMIN R. PADGETT, Primary Examiner

H. E. BEHREND, Assistant Examiner

U.S. Cl. X.R.

122—34